United States Patent
Buyukkoc et al.

(10) Patent No.: US 6,189,043 B1
(45) Date of Patent: *Feb. 13, 2001

(54) DYNAMIC CACHE REPLICATION IN A INTERNET ENVIRONMENT THROUGH ROUTERS AND SERVERS UTILIZING A REVERSE TREE GENERATION

(75) Inventors: Cagatay Buyukkoc; Adrian Emmanuel Eckberg, Jr., both of Holmdel; Pravin Kumar Johri, Aberdeen; Danielle Liu, Holmdel, all of NJ (US)

(73) Assignee: AT&T Corp, New York, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/871,106

(22) Filed: Jun. 9, 1997

(51) Int. Cl.⁷ .................................................. G06F 15/173

(52) U.S. Cl. .................... 709/241; 709/105; 709/202; 709/223; 709/224; 709/238; 709/239; 709/240; 709/242; 370/254; 370/255; 370/256

(58) Field of Search ...................... 395/200.68, 200.72, 395/674, 675, 200.53; 711/133, 136, 137; 364/468.03; 345/327; 709/238, 224, 242, 223, 203, 105, 104, 241, 202, 240, 239; 370/351, 254, 255, 256

(56) References Cited

U.S. PATENT DOCUMENTS

| 5,450,313 | * | 9/1995 | Gilbert et al. .......... 395/709 |
| 5,475,842 | * | 12/1995 | Gilbert et al. .......... 395/706 |
| 5,535,195 | | 7/1996 | Lee ...................... 370/256 |

(List continued on next page.)

OTHER PUBLICATIONS

May, 1996.*
Malpani et al., Making World Wide Web Caching Servers Cooperate, 4th Internaltional WWW Conf, Dec. 1995.*
Basentsch et al., Introducing Application–Level Replication and Naming into today's Web, 5th International WWW Conference, May 1996.*
Baentsch M et al., "Introducing application–level replication and naming into today's Web", Computer Networks and ISDN Systems, vol. 28, No. 11, May 1, 1996, pp. 921–930.
Michael Baentsch et al., "Introducing Application–Level Replication and Naming into today's Web," Fifth International World Wide Web Conference, May 6–10, 1996, Paris, France, pp. 1–12.

(List continued on next page.)

*Primary Examiner*—Mehmet B. Geckil
*Assistant Examiner*—William C. Vaughn, Jr.

(57) ABSTRACT

The distribution of replica caches of information is dynamically optimized among the regions of a network, based upon the changing usage patterns. Initially, a single server in a first region stores the primary copy of information. A router in the first region receives service request messages from the plurality of users throughout network, directed to the server storing the primary copy. To determine if it is justified to deploy a replica cache, the router transmits a monitor request message to other routers in other regions of the network, requesting them to monitor all service requests in their respective regions, being directed to the primary copy in the first server. The first router then computes an optimum assignment of a replica copy of the information, for storage in at least one newly assigned server in the network. The first router transmits a replication message to the newly assigned server, to enable it to store the replica copy of the information and provide service to user terminals in a newly assigned set of regions of the network. The first router also transmits an assignment message to the other routers in the network, to enable them to redirect traffic from their respective regions to either the newly assigned server or to the first server.

18 Claims, 15 Drawing Sheets

U.S. PATENT DOCUMENTS

| | | | | |
|---|---|---|---|---|
| 5,581,753 | * | 12/1996 | Terry et al. | 707/201 |
| 5,606,669 | | 2/1997 | Bertin et al. | 709/223 |
| 5,608,649 | | 3/1997 | Gopinath et al. | 709/242 |
| 5,742,510 | * | 4/1998 | Rostoker et al. | 364/468.03 |
| 5,771,355 | * | 6/1998 | Kuzma | 709/232 |
| 5,774,668 | * | 6/1998 | Choquier et al. | 395/200.53 |
| 5,781,901 | * | 7/1998 | Kuzma | 707/10 |
| 5,805,824 | * | 9/1998 | Kappe | 709/242 |
| 5,835,087 | * | 11/1998 | Herz et al. | 345/327 |
| 5,854,899 | * | 12/1998 | Callon et al. | 709/238 |
| 5,864,854 | * | 1/1999 | Boyle | 707/10 |
| 5,903,723 | * | 5/1999 | Beck et al. | 709/200 |
| 5,920,697 | * | 7/1999 | Masters et al. | 709/219 |
| 5,924,116 | * | 7/1999 | Aggarwal et al. | 711/122 |
| 6,011,782 | * | 1/2000 | DeSimone et al. | 370/260 |
| 6,052,718 | * | 4/2000 | Gifford | 709/219 |
| 6,061,332 | * | 5/2000 | Branton, Jr. et al. | 370/241 |
| 6,070,191 | * | 5/2000 | Narendran et al. | 709/226 |
| 6,097,882 | * | 1/2000 | Mogul | 709/201 |

OTHER PUBLICATIONS

Radhika Malpani et al., "Making World Wide Web Caching Servers Cooperate," pp. 1–12; http://www.w3.org/Conferences?WWW4/Papers59.

* cited by examiner

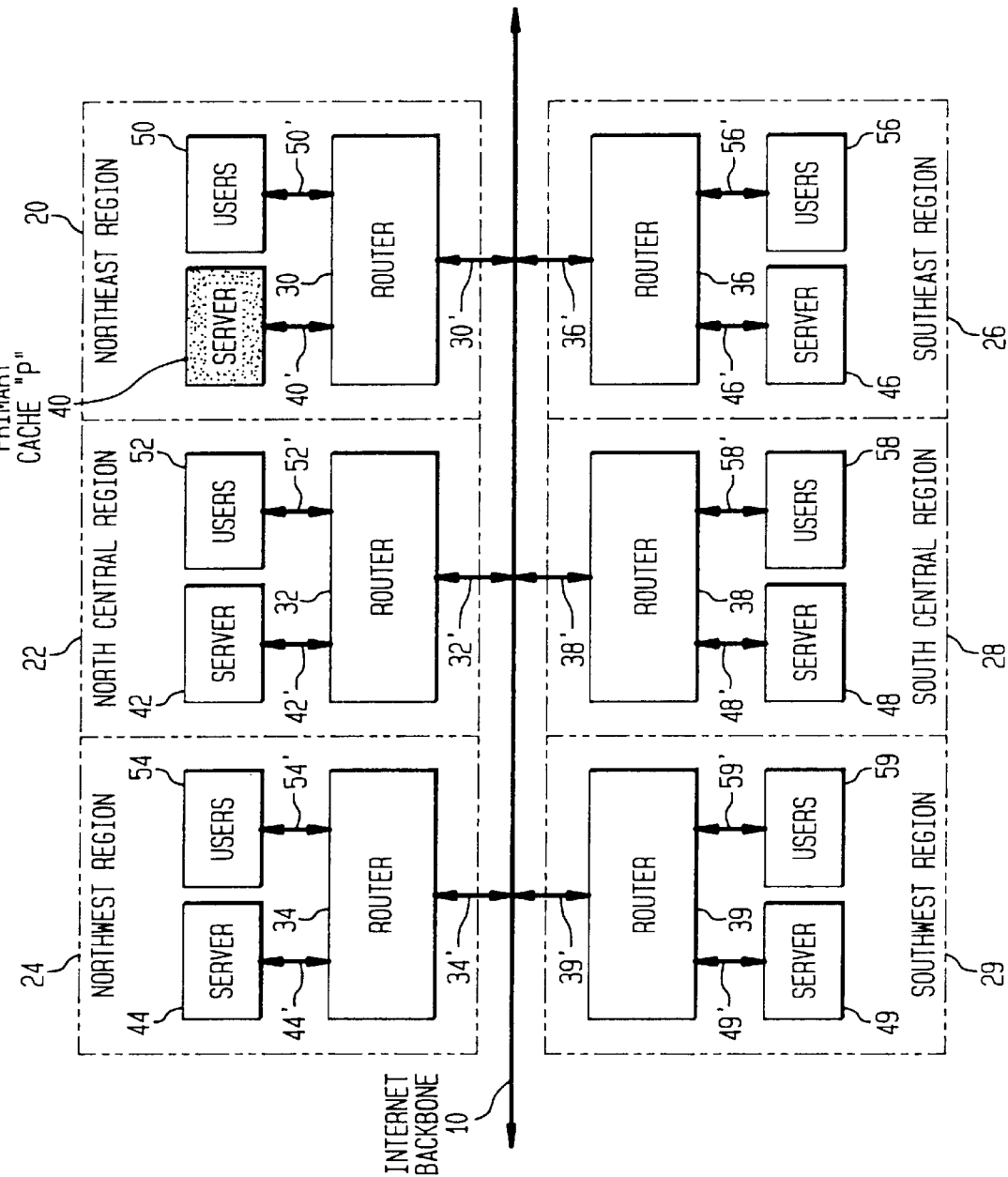

FIG. 2D

EXISTING ROUTER TABLE 334

| LOCAL ACCESS POINT | DESTINATION CACHE SERVER | ROUTER PATH |
|---|---|---|
| USER 50 | 40 | 30 |
| USER 52 | 40 | 32-30 |
| USER 54 | 40 | 34-30 |
| USER 56 | 40 | 36-30 |
| USER 58 | 40 | 38-30 |
| USER 59 | 40 | 39-30 |
| | | |
| | | |

FIG. 2E

NEW ROUTER TABLE 336

| LOCAL ACCESS POINT | DESTINATION CACHE SERVER | ROUTER PATH |
|---|---|---|
| USER 50 | 40 | 30 |
| USER 52 | 48 | 32-38 |
| USER 54 | 44 | 34 |
| USER 56 | 40 | 36-30 |
| USER 58 | 48 | 38 |
| USER 59 | 44 | 39-34 |
| | | |
| | | |

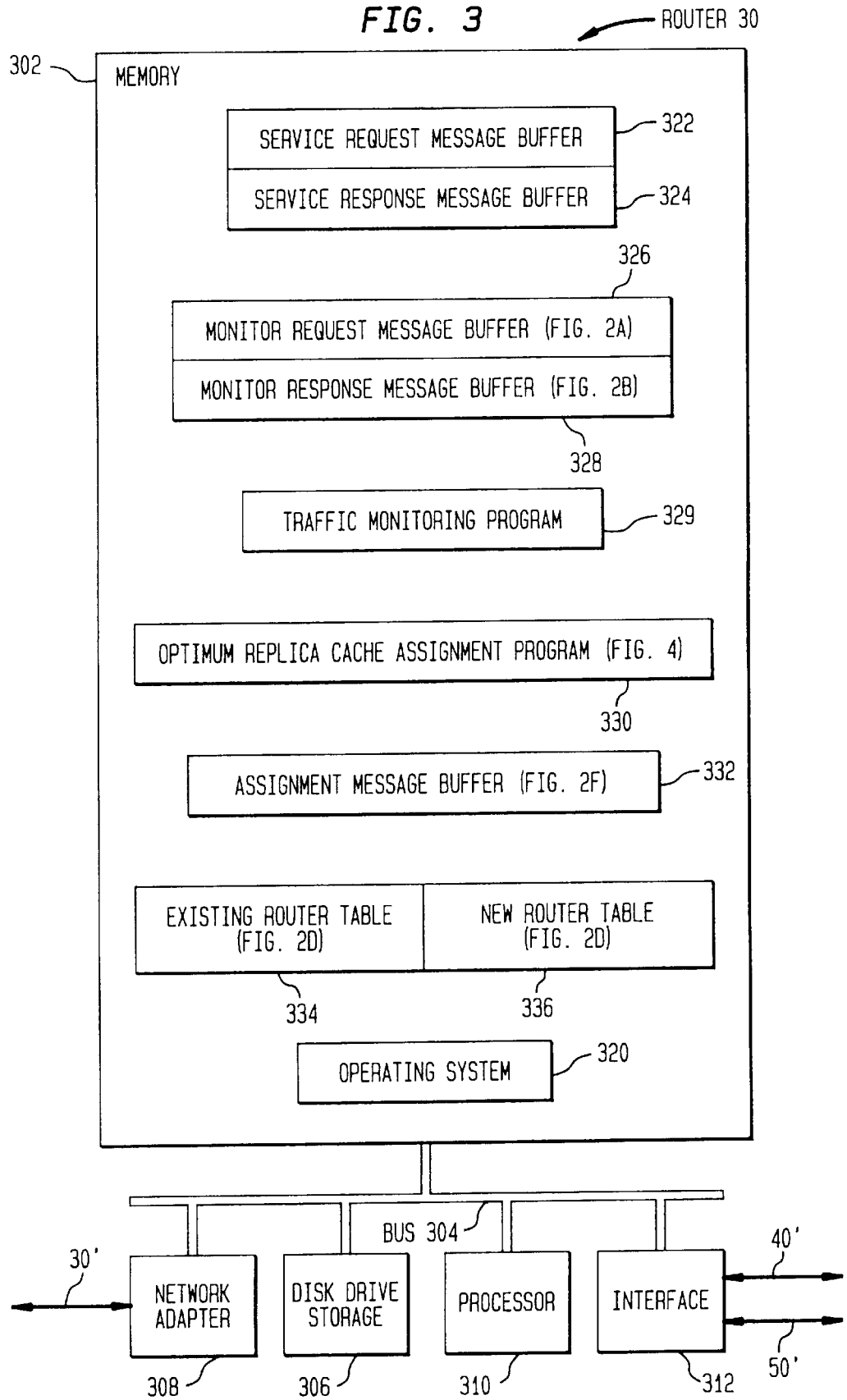

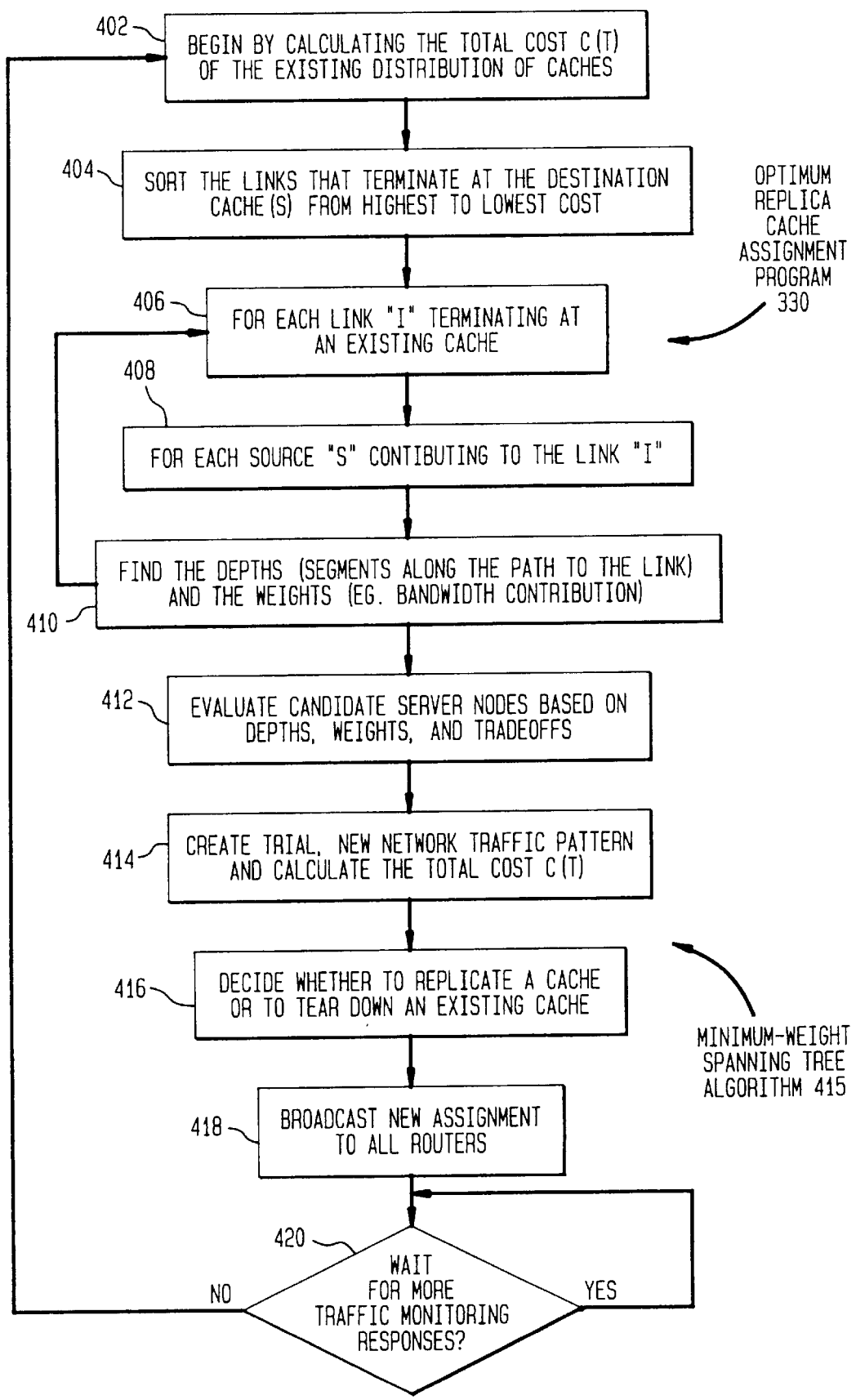

FIG. 7A

EXISTING ROUTER TABLE 334

| LOCAL ACCESS POINT | DESTINATION CACHE SERVER | ROUTER PATH |
|---|---|---|
| 1 | 40 | c-b-a |
| 2 | 40 | c-b-a |
| 3 | 40 | d-h-b-a |
| 4 | 40 | e-h-b-a |
| 5 | 40 | f-g-a |
| 6 | 40 | g-a |
| 7 | 40 | a |
| 8 | 40 | b-a |

FIG. 7B

NEW ROUTER TABLE 336

| LOCAL ACCESS POINT | DESTINATION CACHE SERVER | ROUTER PATH |
|---|---|---|
| 1 | 40 | c-b-a |
| 2 | 40 | c-b-a |
| 3 | 44 | d-h |
| 4 | 44 | e-h |
| 5 | 44 | f-h |
| 6 | 40 | g-a |
| 7 | 40 | a |
| 8 | 40 | b-a |

DYNAMIC CACHE REPLICATION IN A INTERNET ENVIRONMENT THROUGH ROUTERS AND SERVERS UTILIZING A REVERSE TREE GENERATION

TECHNICAL FIELD

This invention relates to telecommunications, and more particularly to a method and apparatus for optimizing the distribution of replica caches of information among diverse regions of a network.

BACKGROUND

There is an inherent redundancy in message traffic on the internet, that generates an excessive load on the backbone network. The caching of certain applications and the provision of web proxies on the internet, eases some of the unnecessary replication in data transfer. The practice of multicasting is another technique to improve the efficiency of distribution. In multicasting, a sender distributes the same document, data, or message to a large number of receivers who are usually dispersed over a wide area.

To improve efficiency, it is beneficial to adopt a scheme in which a copy of the multicast document is delivered in each region to a predetermined server with the local distribution delegated to the server. This replicated cache mechanism may need an efficient tree building algorithm. Several examples of this are already used in internet protocols for static distributions of replica caches.

There are significant problems that are not solved by existing practices in the replication of caches on the internet. The main problem is the dynamic nature of internet traffic, both over time and location. There are locations which are active at certain times of the day and at other times they are inactive. What is needed is a dynamic technique for assigning and reassigning servers in the network that will perform the role of replicated caches.

SUMMARY

In one application of the invention, a network includes a plurality of regions, with each region including a router, a server, and a plurality of user terminals. The router in each region couples the server and the plurality of user terminals to the network. In accordance with the invention, the distribution of replica caches of information is dynamically optimized among the regions of the network, based upon the changing usage patterns. This operation of the invention is referred to herein as reverse tree generation. Initially, a single server in a first region stores the primary copy of information. A router in the first region receives service request messages from the plurality of users throughout network, directed to the server storing the primary copy.

A processor, which can be in the router or associated with the router, transmits a monitor request message to other routers in other regions of the network, requesting them to monitor all service requests in their respective regions, which are directed to the primary copy in the first server. In response to this, the processor receives monitor response messages from the other routers, providing a count of service requests being directed to the first server.

The processor then computes an optimum assignment of a replica copy of the information, for storage in at least one newly assigned server in the network. The processor transmits a replication message to the newly assigned server, to enable it to store the replica copy of the information and provide service to user terminals in a newly assigned set of regions of the network. The processor also transmits an assignment message to the other routers in the network, to enable them to redirect traffic from their respective regions to either the newly assigned server or to the first server.

The discussion in this Summary and the following Brief Description of the Drawings, Detailed Description, and drawings only deal with examples of this invention and are not to be considered in any way a limitation on the scope of the exclusionary rights conferred by a patent which may issue from this application. The scope of such exclusionary rights is set forth in the claims at the end of this application.

BRIEF DESCRIPTION OF THE DRAWINGS

FIGS. 1A to 1E show a succession of states of an example network organizing itself into a primary cache and two replica caches for three service domains.

FIG. 2D shows an assignment message and FIG. 2E shows a replication message for the example network of FIG. 1E.

FIG. 3 shows an architectural diagram of the router 30 in FIG. 1A.

FIG. 4 shows a flow diagram of the optimum replica cache assignment program.

FIGS. 7A and 7B show router tables for the network organizations of FIGS. 5 and 6, respectively.

DETAILED DESCRIPTION OF THE PREFERRED EMBODIMENTS

Figure 1B:
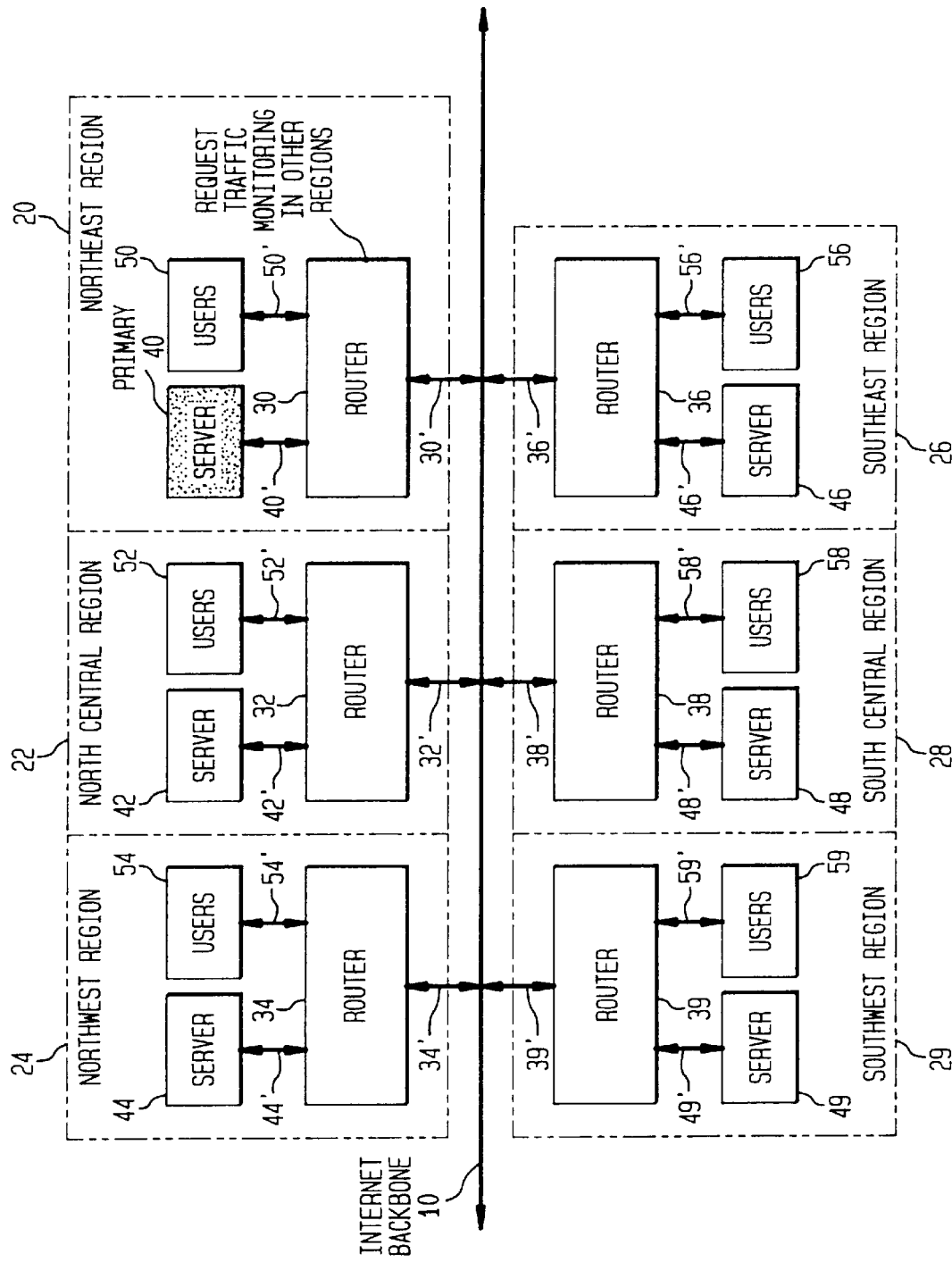
Figure 1C:
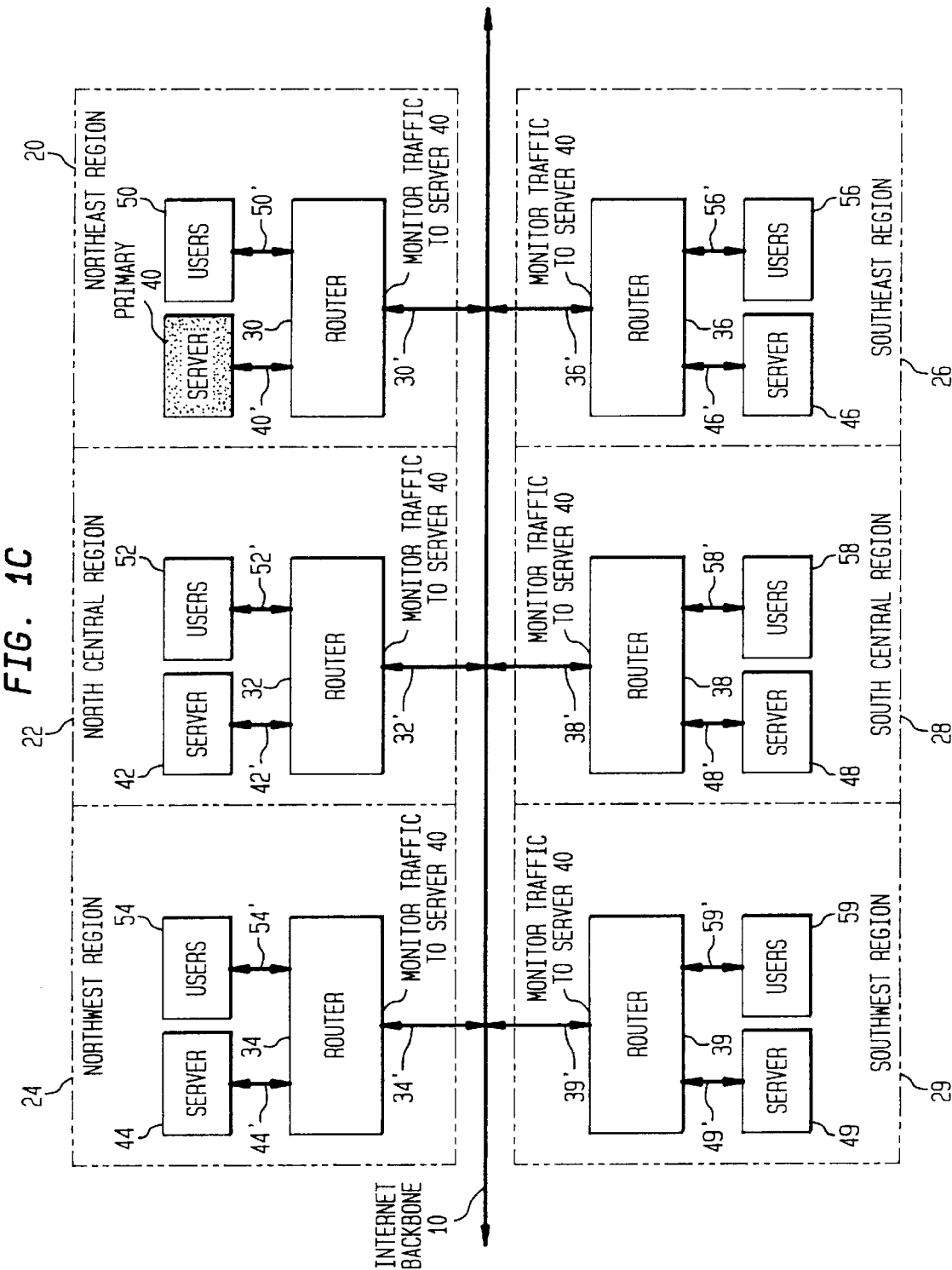
Figure 1D:
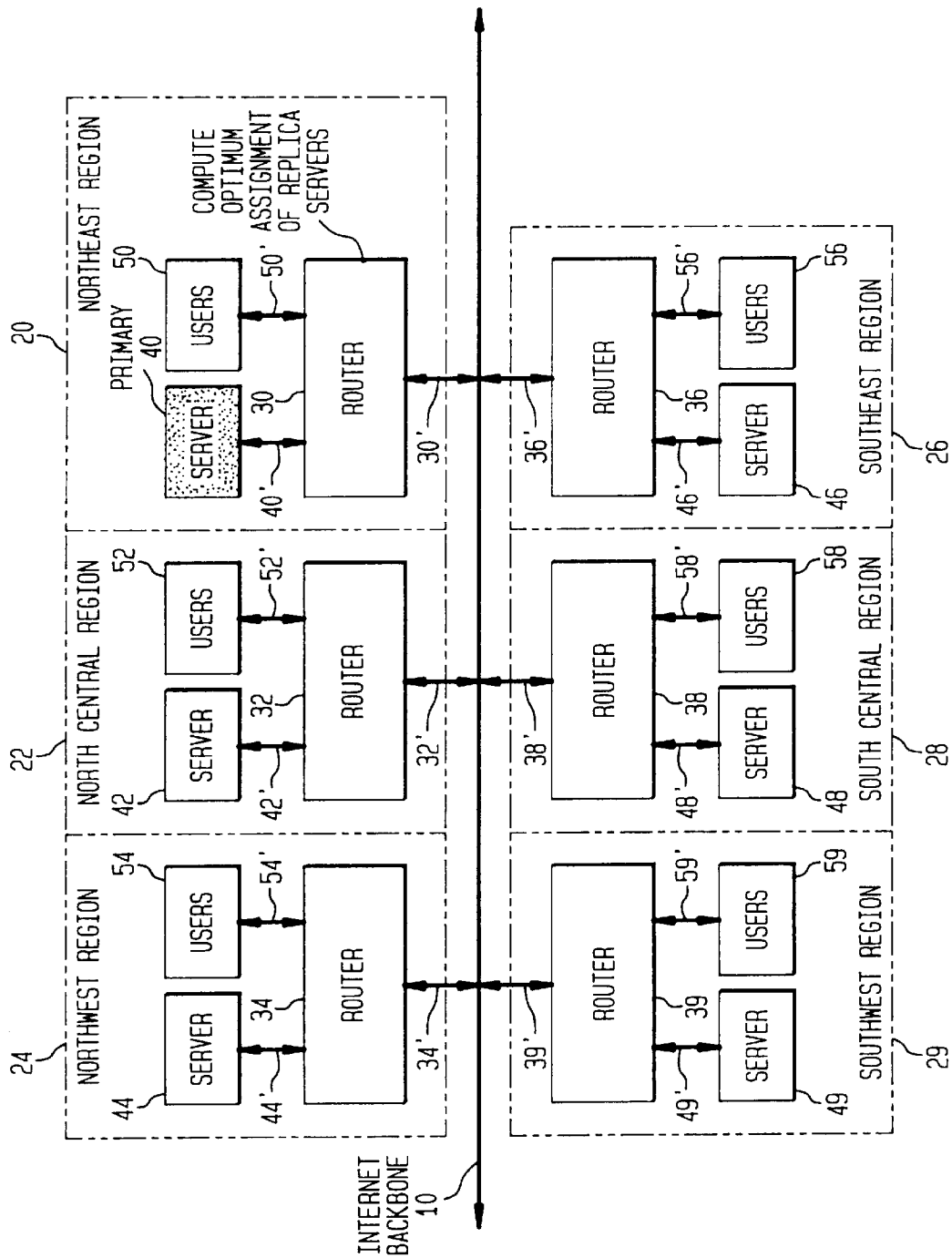

FIGS. 1A to 1E show a succession of stages of an example network as it automatically organizes itself to optimize the distribution of replica caches of information among its regions. This operation of the invention is referred to herein as reverse tree generation. The example network shown is the internet network in the United States, that is built around the internet backbone network 10. FIG. 1A shows a first stage in the organization of the network when the server 40 in the northeast region 20 stores the sole copy of a data set that is accessed by users in all the regions of the network. The copy of the data set in server 40 is the primary information cache "P". This data set may represent, for example, the information for a particular internet website. During periods of stable operation, service request messages are received at router 30 in the northeast region of the network, from users in all of the regions of the network. Those service requests are to access the primary cache "P" copy of the data set stored in the server 40. If this data set represents a popular internet website, for example the New York Times website "www.nytimes.com", then router 30 will be kept very busy handling these service requests. The invention operates to reduce the load of service requests on router 30, by automatically distributing one or more replicas of the data set to new servers in remote regions of the network and assigning new routing tables to the routers in the network. The new routing tables redirect service requests originating from users in remote regions, to the new servers which share the load of service requests with the original server 40.

The network of FIG. 1A includes a plurality of regions: the northeast region 20, the north central region 22, the northwest region 24, the southeast region 26, the south central region 28, and the southwest region 29. Each of the respective regions includes a router 30, 32, 34, 36, 38, and 39 connected to the backbone network 10 by the respective path 30', 32', 34', 36', 38', and 39'. Each of the respective regions includes a server 40, 42, 44, 46, 48, and 49 connected to its respective router by the respective path 40', 42', 44', 46', 48', and 49'. Each of the respective regions includes a plurality of user terminals 50, 52, 54, 56, 58, and 59 connected to their respective router by the respective path 50', 52', 54', 56', 58', and 59'. In each of the regions, the respective router couples the respective server and the respective plurality of user terminals to the internet backbone network 10, by means of the links 30', 32', 34', 36', 38', and 39'. FIG. 2D shows the existing router table 334 for the original organization of the network in FIG. 1A, where the server 40 in the northeast region 20 stores the sole copy of a data set as primary cache "P" that is accessed by users in all the regions of the network. Router table 334 is stored at each router 30, 32, 34, 36, 38, and 39 in the network.

Figure 2A:
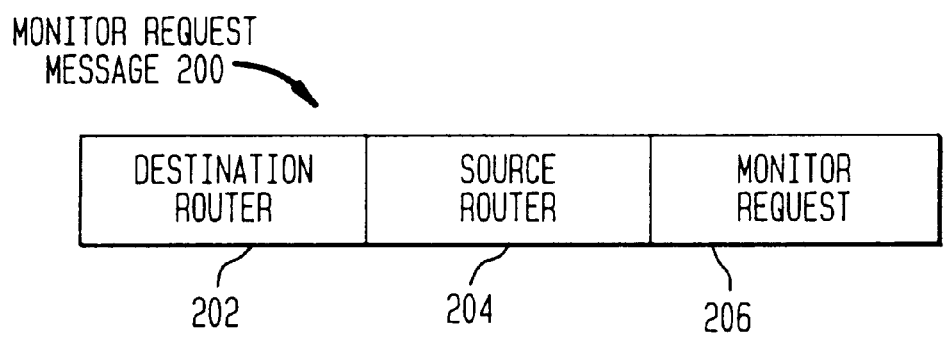
FIGS. 2A to 2C show message formats for router control for the example network of FIGS. 1A to 1E.
Figure 2B:
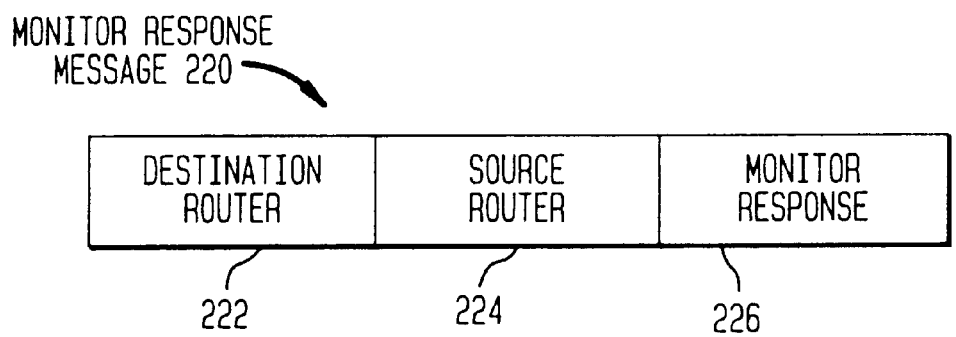

FIG. 1B shows the next stage of the network organizing itself for optimizing the distribution of replica caches of information among the regions. Router 30, or a processor associated with router 30, transmits a monitor request message to all of the other routers 32, 34, 36, 38, and 39 connected to the backbone network 10 requesting the other routers to monitor service requests originating in their regions, that are directed to the primary cache in server 40. FIG. 2A shows an example of a monitor request message 200 that is sent out by Router 30 to all of the other routers 32, 34, 36, 38, and 39 connected to the backbone network 10. The monitor request message 200 includes a field 202 specifying the destination router, a field 204 specifying the source router, and a field 206 specifying the monitor request. The monitor request message 200 is broadcast to all other routers 32, 34, 36, 38, and 39 in the network.

FIG. 3 is an architectural diagram of the router 30. All of the other routers 32, 34, 36, 38, and 39 in the network have a similar architecture. Router 30 includes a memory 302 connected by the system bus 304 to the network adapter 308, the disk drive storage 306, the processor 310, and the server interface 312. The network adapter 308 connects the router 30 over path 30' to the backbone network 10. The server interface 312 connects the router 30 over path 40' to the server 40. The interface 312 can also connect the router 30 over path 50' to the users 50 in FIG. 1A.

The memory 302 in FIG. 3 stores the service request message buffer 322 that receives service request messages from the backbone network 10 and from the local users 50. Service request messages are passed on to the server 40 for processing. The memory 302 in FIG. 3 stores the service response message buffer 324 that receives service response messages from the server 50. Service response messages are forwarded to the backbone network 10 or to the local users 50.

The memory 302 in FIG. 3 stores the monitor request message buffer 326 that stores the monitor request message 200 of FIG. 2A. In router 30, which originates the message 200, the message is built in buffer 326 and then transmitted by the network adapter 308 to the other routers 32, 34, 36, 38, and 39. This stage is depicted in FIG. 1B, where router 30 broadcasts a request for traffic monitoring to the other routers. In routers 32, 34, 36, 38, and 39 which receive the message 200 over their respective network adapters 308, the message 200 is buffered and read. The monitor request message 200 identifies the data set stored as the primary cache "P" in the server 40. The monitor request message 200 asks the destination routers 32, 34, 36, 38, and 39 to monitor all messages that they handle and to count the number of service requests directed to server 40 that request access to the data set stored as the primary cache "P". The monitor request message 200 asks the destination routers 32, 34, 36, 38, and 39 to respond to router 30 with a traffic value that is the accumulated count of such service requests over a given period of time.

The memory 302 in FIG. 3 stores the traffic monitoring program 329. It runs under the operating system program 320, with its instructions being executed on the processor 310. In routers 32, 34, 36, 38, and 39 which receive the monitor request message 200 over their respective network adapters 308, the traffic monitoring program 329 reads the message 200 buffered in buffer 326 and performs the traffic monitoring operation shown in FIG. 1C. In each of the destination routers 32, 34, 36, 38, and 39, the traffic monitoring program 329 monitors all messages that the router handles and counts the number of service requests directed to server 40 that request access to the data set stored as the primary cache "P". The traffic monitoring program 329 in the originating router 30 also performs this monitoring operation for the users 50 in the router's own region 20. The traffic monitoring program 329 in each of the routers 30, 32, 34, 36, 38, and 39 responds to router 30 with a traffic value that is the accumulated count of such service requests over a given period of time. The memory 302 in FIG. 3 stores the monitor response message buffer 328 that stores the monitor response message 220. The monitor response message 220 includes a field 222 specifying the destination router, a field 224 specifying the source router, and a field 226 specifying the monitor response which is the traffic value measured at that router. The monitor response message 220 is then transmitted by each router 32, 34, 36, 38, and 39 back to the originating router 30.

The memory 302 in FIG. 3 stores the optimum replica cache assignment program 330. It runs under the operating system program 320, with its instructions being executed on the processor 310. In the originating router 30 of FIG. 1D, the assignment program 330 computes the optimum distribution of replicas of the data set stored as the primary cache "P". This is based on the traffic values in each remote region 22, 24, 26, 28, and 29 reported by each router 32, 34, 36, 38, and 39, and also as locally measured in region 20 by router 30. The optimum replica cache assignment program 330 is described in the flow diagram of FIG. 4.

The optimum replica cache assignment program 330 is based on an algorithm that performs a cost/benefit analysis of adding or deleting replica caches. The cost/benefit analysis algorithm will be described in greater detail below, in connection with an example of its application to a second network shown in FIGS. 5 and 6. The assignment program 330 periodically updates this cost/benefit analysis based on updated traffic monitoring measurements from the remote regions of the network. The cost/benefit analysis algorithm determines if a critical threshold quantity of traffic has accumulated in a region that justifies setting up a replica cache on a new server. The cost/benefit analysis algorithm uses a minimum weight spanning tree analysis or a Steiner tree analysis to make that determination. The assignment program 330 then computes new routing tables for the routers in the network, to redirect some of the service requests to the replica cache on the new server. The memory 302 in FIG. 3 stores the existing router table 334 and the new router table 336. An example of the existing router table 334 is shown in FIG. 2D and an example of the new router table 336 is shown in FIG. 2E.

Figure 2C:
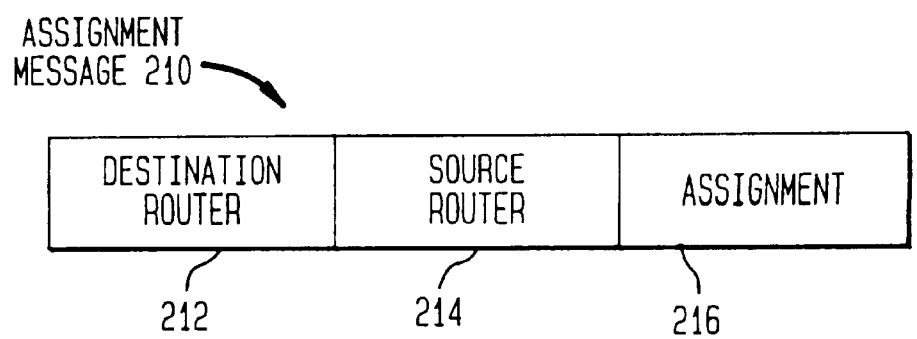
Figures 2F, 2G:
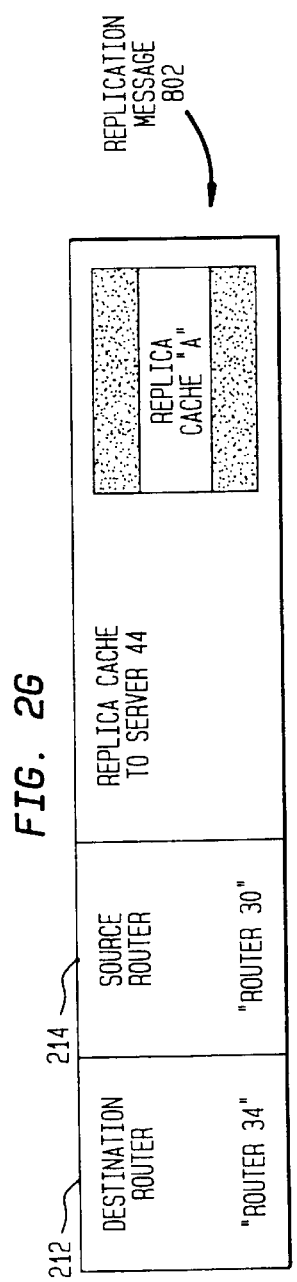
FIG. 2F shows an assignment message and FIG. 2G shows a replication message.

The memory 302 in FIG. 3 stores the assignment message buffer 332 where the router 30 builds an assignment message 210, as shown in FIG. 2C. The assignment message 210 includes a field 212 specifying the destination router, a field 214 specifying the source router, and a field 216 specifying the new routing assignment computed by the cost/benefit analysis algorithm. FIG. 2F shows an example of the assignment message 210. The field 212 specifies a broadcast to destination routers 32, 34, 36, 38, and 39. The field 214 specified the source router as router 30. And the assignment field 216 specifies an example of the new router table 336 shown in FIG. 2E. The assignment message 210 is broadcast to all other routers 32, 34, 36, 38, and 39 in the network. It is also stored for use in the originating router 30. A replication message 802 shown in FIG. 2G, is sent from the router 30 to the router 34, for example, to provide a copy of the data set as replica cache "A" to the new server 44 in region 24. The field 212 specifies a destination router 34. The field 214 specifies the source router as router 30. A corresponding replication message is sent from the router 30 to the router 38, for example, to provide a copy of the data set as replica cache "B" to the new server 48 in region 28.

Figure 1E:
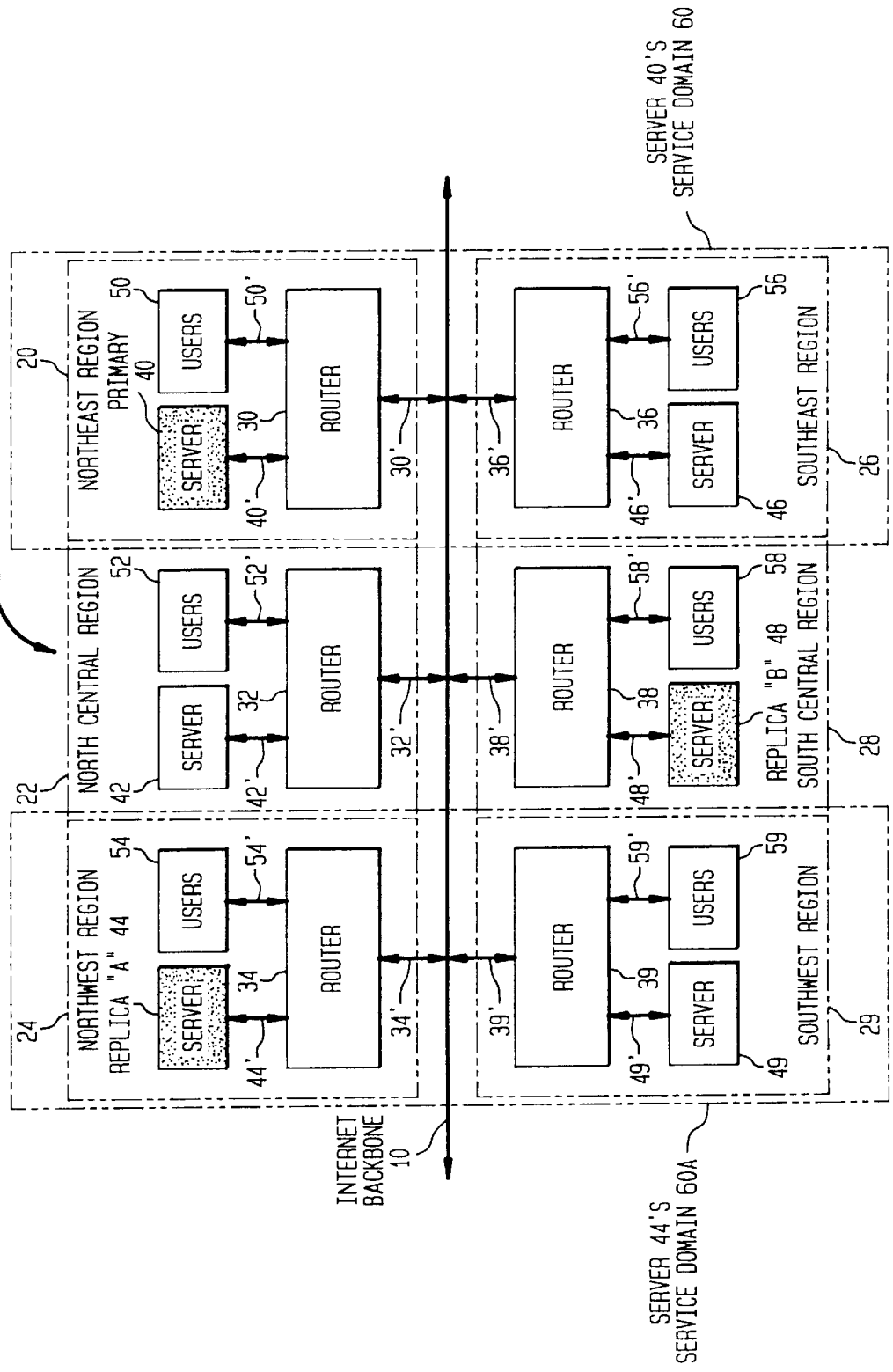

FIG. 1E shows the result of the reverse tree generation operation of the invention on the network of FIG. 1A, after the reassignment message 210 has been broadcast by router 30 to all other routers 32, 34, 36, 38, and 39 in the network. FIG. 2E shows the new router table for the updated organization of the network in FIG. 1E, where two additional replica caches have been created in the network. Replica cache "A" is a new copy of the data set stored in new server 44 in region 24. Router 34 handles all service requests to server 44. The service domain 60A for server 44 is the northwest region 24 and the southwest region 29. Router 34 in region 24 and router 39 in region 29 are controlled by the new router table 336 of FIG. 2E to redirect to the replica cache "A" on server 44, all of the service requests to access the data set that originate in regions 24 and 29. Replica cache "B" is a new copy of the data set stored in new server 48 in region 28. Router 38 handles all service requests to server 48. The service domain 60B for server 48 is the north central region 22 and the south central region 28. Router 32 in region 22 and router 38 in region 28 are controlled by the new router table 336 of FIG. 2E to redirect to the replica cache "B" on server 48, all of the service requests to access the data set that originate in regions 22 and 28. Primary cache "P" is the existing copy of the data set stored in original server 40 in region 20. Router 30 handles all service requests to server 40. The service domain 60 for server 40 is the northeast region 20 and the southeast region 26. Router 30 in region 20 and router 36 in region 26 are controlled by the new router table 336 of FIG. 2E to redirect to the primary cache "P" on server 40, all of the service requests to access the data set that originate in regions 20 and 26.

Figure 1F:
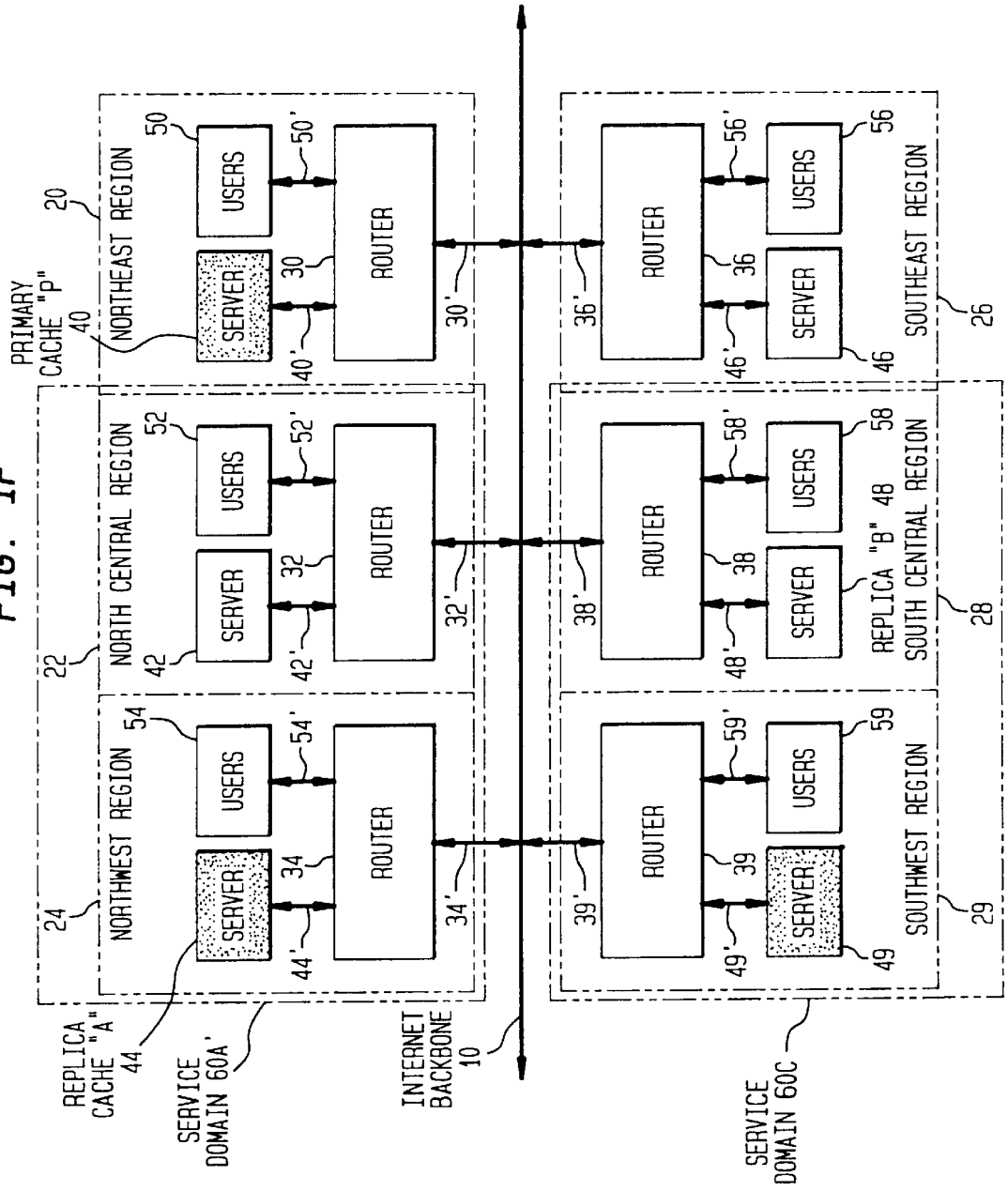
FIG. 1F shows the result of the network of FIG. 1E periodically reorganizing itself into a primary cache and revised replica caches with revised service domains.

FIG. 1F shows the result of the network periodically reorganizes itself into a primary cache and revised replica caches with revised service domains. In FIG. 1E, router 30 periodically transmits a monitor request message to all of the other routers 32, 34, 36, 38, and 39 connected to the backbone network 10 requesting the other routers to monitor service requests originating in their regions, accessing the data set in either replica cache "A", replica cache "B", or primary cache "P". The routers 32, 34, 36, 38, and 39 receive the monitor request message 200 over their respective network adapters 308. The traffic monitoring program 329 reads the message 200 buffered in buffer 326 and performs the traffic monitoring operation. In each of the destination routers 32, 34, 36, 38, and 39, the traffic monitoring program 329 monitors all messages that the router handles and counts the number of service requests directed to server 40, or 44, or 48 that request access to the data set stored as the primary cache "P", the replica cache "A", or the replica cache "B", respectively. The originating router 30 computes the optimum distribution of replicas of the data set stored as the primary cache "P". This is based on the traffic values in each remote region 22, 24, 26, 28, and 29 reported by each router 32, 34, 36, 38, and 39, and also as locally measured in region 20 by router 30. FIG. 1F shows the network of FIG. 1E, after the reassignment message 210 has been broadcast by router 30 to all other routers 32, 34, 36, 38, and 39 in the network. Replica cache "A" remains the same copy of the data set stored in server 44 in region 24. Router 34 handles all service requests to server 44. The service domain 60A' for server 44 has changed to become the northwest region 24 and the north central region 22. Router 34 in region 24 and router 32 in region 22 are controlled by a new router table to redirect to the replica cache "A" on server 44, all of the service requests to access the data set that originate in regions 24 and 22. Replica cache "B" has been torn down. Replica cache "C" is a new copy of the data set stored in new server 49 in region 29. Router 39 handles all service requests to server 49. The service domain 60C for server 49 is the southwest region 292 and the south central region 28. Router 39 in region 29 and router 38 in region 28 are controlled by the new router table to redirect to the replica cache "C" on server 49, all of the service requests to access the data set that originate in regions 29 and 28. Primary cache "P" is the existing copy of the data set stored in original server 40 in region 20. Router 30 handles all service requests to server 40. The service domain 60 for server 40 is the northeast region 20 and the southeast region 26. Router 30 in region 20 and router 36 in region 26 are controlled by the new router table to redirect to the primary cache "P" on server 40, all of the service requests to access the data set that originate in regions 20 and 26. In this manner the network periodically reorganizes itself into a primary cache and revised replica caches with revised service domains to accommodate dynamically changing traffic patterns.

The optimum replica cache assignment program 330 is described in the flow diagram of FIG. 4. The assignment program 330 uses a cost/benefit analysis algorithm 415 that is a type of minimum weight spanning tree analysis. The links connecting all of the router nodes in the network form an undirected graph. Since the links connect all of the routers in the network, it forms a tree that spans the graph, thus the name "spanning tree". Each of the links is weighted with a cost value related to the number of requests per unit time "T". The value "T" is the number of requests passing over the link for a data set of a given size that is stored in a target cache on a target server. The value of "T" is the message traffic number of requests per unit time of the link. The sum of the number of requests per unit times for all of the links is related to the bandwidth cost C[BW]. The total cost C[T] of the existing distribution of caches, includes the bandwidth cost C[BW] as a factor. The purpose of the optimum replica cache assignment program 330 is to find a distribution of replica caches storing the data set, that minimizes the total cost C[T]. Thus, the cost/benefit analysis algorithm 415 is a type of minimum weight spanning tree analysis.

Step 402 begins by calculating the total cost C[T] of the existing distribution of caches. In order to evaluate the impact of the adding replicated server, a cost function is defined that takes into account the resources utilized and the various costs. This includes the opportunity cost in case a single server (or a series of servers) is overloaded and the potential customers drop out before being served.

Let C[T] denote the total cost. Define C[BW] as the bandwidth cost, C[STO] as the storage cost at the base location, C[REP] as the replication cost in a single server, C[OC] as the opportunity cost, C[UP] is the update cost associated with updating the replicated copies to keep them from being stale. Hence, C[T]=C[BW]+C[STO]+C[REP]+C[OC]+C[UP].

The bandwidth cost C[BW] is a function of the number of requests per unit times used on the individual links and is the product of a proportionality constant attributed to the number of requests per unit time, times the sum of the number of requests per unit times on each link. The calculation of C[BW] can be illustrated with the example network shown in FIG. 5.

Figure 5:
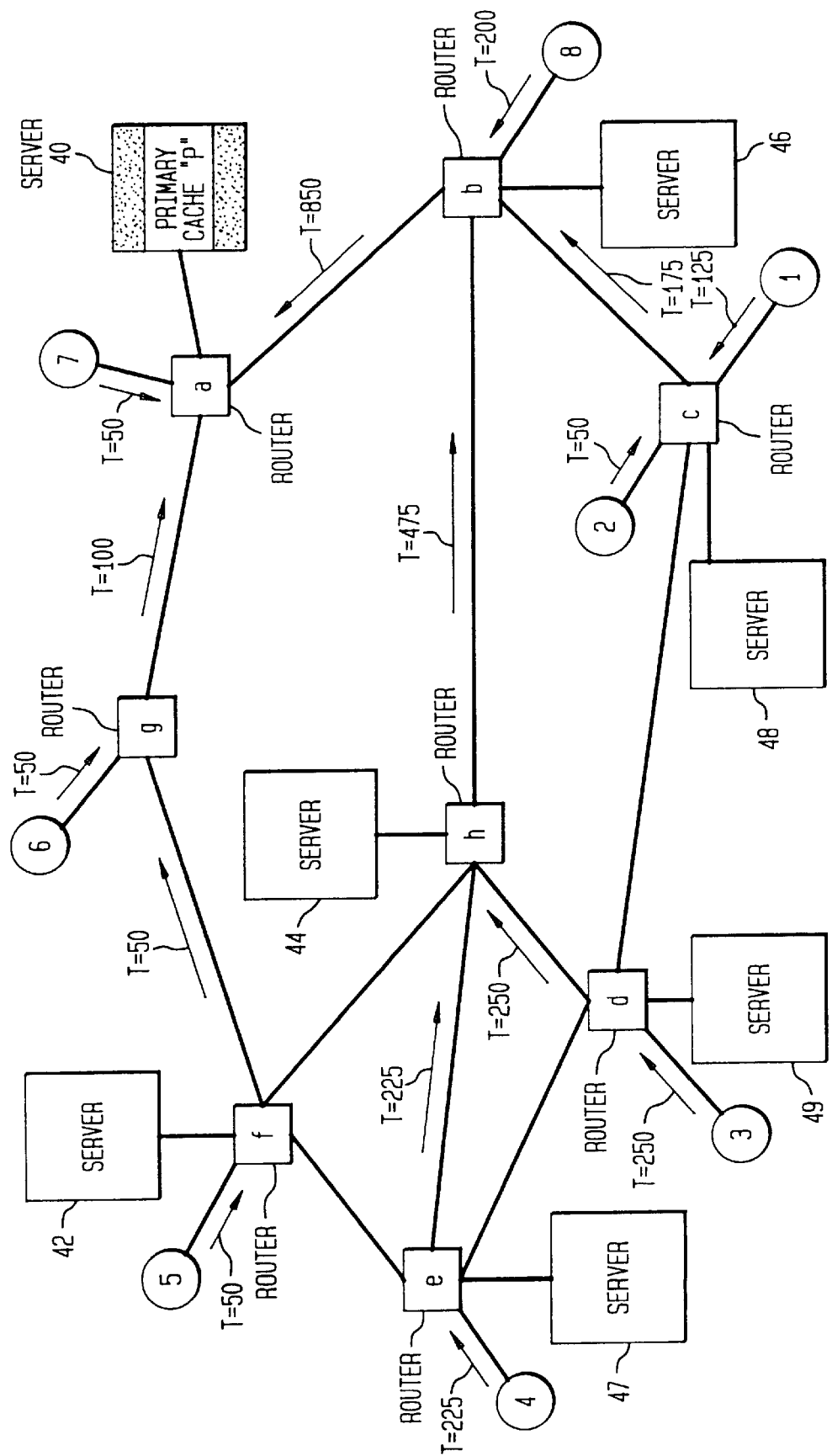
FIG. 5 shows a first stage organization of a second example network.

FIG. 5 shows a second network with eight routers a, b, c, d, e, f, g, and h connecting eight user local access points 1, 2, 3, 4, 5, 6, 7, and 8 so that they can access a data set whose sole copy is stored as the primary cache "P" on server 40. Server 40 is connected by router "a" to the other routers b, c, d, e, f, g, and h in the network. Router "a" is currently handling 1000 requests per hour for a ten-megabyte file stored in primary cache "P" as part of the data set on server 40. In accordance with the invention, reverse tree generation is used to dynamically reorganize the caches in the network in response to usage patterns. Router "a" periodically broadcasts a monitoring request to the other routers b, c, d, e, f, g, and h to begin monitoring each of the network links that it handles for a period, e.g. of one hour. FIG. 7A shows the existing router table 334 for the network of FIG. 5.

During the monitoring period, each user local access point makes a quantity of "T" requests for the ten-megabyte file stored in primary cache "P" as part of the data set on server 40. The value of "T" is the message traffic number of requests per unit time. User local access point 1 is monitored by its servicing router "c" to have a message traffic number of requests per unit time to server 40 of T=125. User local access point 2 is monitored by its servicing router "c" to have a message traffic number of requests per unit time to server 40 of T=50. User local access point 3 is monitored by its servicing router "d" to have a message traffic number of requests per unit time to server 40 of T=250. User local access point 4 is monitored by its servicing router "e" to have a message traffic number of requests per unit time to server 40 of T=225. User local access point 5 is monitored by its servicing router "f" to have a message traffic number of requests per unit time to server 40 of T=50. User local access point 6 is monitored by its servicing router "g" to have a message traffic number of requests per unit time to server 40 of T=50. User local access point 7 is monitored by its servicing router "a" to have a message traffic number of requests per unit time to server 40 of T=50. User local access point 8 is monitored by its servicing router "b" to have a message traffic number of requests per unit time to server 40 of T=200.

During the monitoring period, each network link is monitored to pass a quantity of "T" requests for the ten-megabyte file stored in primary cache "P" as part of the data set on server 40. The eleven network links interconnecting the routers of FIG. 5 are monitored as follows. Network link "a-b" connecting routers "a" and "b" has a message traffic number of requests per unit time to server 40 of T=850. Network link "b-c" connecting routers "b" and "c" has a message traffic number of requests per unit time to server 40 of T=175. Network link "c-d" connecting routers "c" and "d" has a message traffic number of requests per unit time to server 40 of T=0. Network link "d-e" connecting routers "d" and "e" has a message traffic number of requests per unit time to server 40 of T=0. Network link "e-f" connecting routers "e" and "f" has a message traffic number of requests per unit time to server 40 of T=0. Network link "f-g" connecting routers "f" and "g" has a message traffic number of requests per unit time to server 40 of T=50. Network link "g-a" connecting routers "g" and "a" has a message traffic number of requests per unit time to server 40 of T=100. Network link "d-h" connecting routers "d" and "h" has a message traffic number of requests per unit time to server 40 of T=250. Network link "e-h" connecting routers "e" and "h" has a message traffic number of requests per unit time to server 40 of T=225. Network link "f-h" connecting routers "f" and "h" has a message traffic number of requests per unit time to server 40 of T=0. Network link "h-b" connecting routers "h" and "b" has a message traffic number of requests per unit time to server 40 of T=475.

The bandwidth cost C[BW] for the network of FIG. 5 is calculated in step 402 of FIG. 4, to be the product of a proportionality constant attributed to the number of requests per unit time, times the sum of the number of requests per unit times on each link. For this example the number of requests per unit time cost per megabit is assumed to be 0.1. The sum of the values of "T" for the eleven network links is 2125. Thus, the bandwidth cost C[BW] calculated in step 402 for the network of FIG. 5 is 2125 (which is 2125 requests times 10 megabits per request times 0.1 cost per megabit.)

Next, step 402 of FIG. 4 calculates C[STO], the storage cost at the base location. For this example, this value is 500. Next, step 402 of FIG. 4 calculates C[REP], the replication cost in a single server. Since there is no replication yet, this value is zero. Next, step 402 of FIG. 4 calculates C[OC] the opportunity cost. Market research shows that the opportunity cost per lost hit is five. Empirical observation of the number of lost hits per hour is 100. Thus, the value of C[OC] for the opportunity cost is 500, for this example. Next, step 402 of FIG. 4 calculates C[UP] the update cost associated with updating the replicated copies to keep them from being stale. Since there is no replication yet, this value is zero. Thus, step 402 of FIG. 4 calculates C[T]=C[BW]+C[STO]+C[REP]+C[OC]+C[UP] to have a value of 2125+500+0+500+0=3125.

Next, step 404 of FIG. 4 sorts the links that terminate at the destination cache or caches, from the highest link to lowest cost. For the example network of FIG. 5, the sorted order is as follows.
Network link "a-b" T=850.
Network link "g-a" T=100.

Next, step 406 of FIG. 4 starts a loop. For each link "I" terminating at an existing cache, perform steps 408 and 410. Step 408 starts a nested loop, for each source "S" contributing to the link "I", perform step 410. Step 410 finds the depth (the number of segments along the path to the link) and the weight (e.g., the bandwidth contribution) of the source. For the network of FIG. 5, step 406 starts with the highest cost link which is network link "a-b" with T=850.

The sources for traffic to network link "a-b" are routers c, d, e, and h and the user local access point 8. Step 408 starts the nested loop, for each source contributing to the network link "a-b", perform step 410. For the contribution of router "e", Step 410 finds the depth (the number of segments along the path to the link) as three: segment e-h, segment h-b, and segment b-a. Then step 410 multiplies the depth value of three times the number of requests per unit time from router "e" of 225, resulting in a contribution of 675 from router "e". If router "e" were eliminated from contributing to the network link "a-b", then a cost of 675 could be avoided. For example, server 47 is connected to router "e" in FIG. 5. If server 47 were made a replica server for the data set in primary cache "P", then a cost of 675 would be avoided. However, this cost avoidance would have to be balanced against the cost of replicating the data set in server 47. This balancing is carried out in steps 414 and 416, as will be described later.

For the contribution of router "d", Step 410 finds the depth (the number of segments along the path to the link a-b) as three: segment d-h, segment h-b, and segment b-a. Then step 410 multiplies the depth value of three times the number of requests per unit time from router "d" of 250, resulting in a contribution of 750 from router "d". If router "d" were eliminated from contributing to the network link "a-b", then a cost of 750 could be avoided. For example, server 49 is connected to router "d" in FIG. 5. If server 49 were made a replica server for the data set in primary cache "P", then a cost of 750 would be avoided. However, this cost avoidance would have to be balanced against the cost of replicating the data set in server 49. This balancing is carried out in steps 414 and 416, as will be described later.

For the contribution of router "c", Step 410 finds the depth (the number of segments along the path to the link) as two: segment c-b and segment b-a. Then step 410 multiplies the depth value of two times the number of requests per unit time from router "c" of 175, resulting in a contribution of 350 from router "c". If router "c" were eliminated from contributing to the network link "a-b", then a cost of 350 could be avoided. For example, server 48 is connected to router "c" in FIG. 5. If server 48 were made a replica server for the data set in primary cache "P", then a cost of 350 would be avoided. However, this cost avoidance would have to be balanced against the cost of replicating the data set in server 48. This balancing is carried out in steps 414 and 416, as will be described later.

For the contribution of router "h", Step 410 finds the depth (the number of segments along the path to the link) as two: segment h-b and segment b-a. Then step 410 multiplies the depth value of two times the number of requests per unit time from router "h" of 475, resulting in a contribution of 950 from router "h". If router "h" were eliminated from contributing to the network link "a-b", then a cost of 950 could be avoided. For example, server 44 is connected to router "h" in FIG. 5. If server 44 were made a replica server for the data set in primary cache "P", then a cost of 950 would be avoided. However, this cost avoidance would have to be balanced against the cost of replicating the data set in server 44. This balancing is carried out in steps 414 and 416, as will be described later.

For the contribution of user local access point 8, Step 410 finds the depth (the number of segments along the path to the link) as one: segment b-a. Then step 410 multiplies the depth value of one times the number of requests per unit time from the user local access point of 200, resulting in a contribution of 200 from user local access point 8. If user local access point 8 were eliminated from contributing to the network link "a-b", then a cost of 200 could be avoided. For example, server 46 is connected to router "b" in FIG. 5. If server 46 were made a replica server for the data set in primary cache "P", then a cost of 850 would be avoided. However, this cost avoidance would have to be balanced against the cost of replicating the data set in server 46. This balancing is carried out in steps 414 and 416, as will be described later.

For the network of FIG. 5, the loop beginning at step 406 continues with the next highest cost link which is network link "g-a" with T=100.

Next, step 412 of FIG. 4 evaluates candidate server nodes based on the calculated depths and weights determined from steps 406, 408, and 410. In the example of FIG. 5, there are six candidate servers on which can be stored a replica cache of the data set in primary cache "P". Server 42 is connected by router "f" to the network. Server 44 is connected by router "h" to the network. Server 46 is connected by router "b" to the network. Server 47 is connected by router "e" to the network. Server 48 is connected by router "c" to the network. And server 49 is connected by router "d" to the network.

Step 412 uses the results of the loop performed by steps 406, 408, and 410, discussed above. If server 44 were made a replica server for the data set in primary cache "P", then a cost of 950 would be avoided. If server 46 were made a replica server for the data set in primary cache "P", then a cost of 850 would be avoided. If server 47 were made a replica server for the data set in primary cache "P", then a cost of 675 would be avoided. If server 48 were made a replica server for the data set in primary cache "P", then a cost of 350 would be avoided. If server 49 were made a replica server for the data set in primary cache "P", then a cost of 750 would be avoided. Evaluating these results, step 412 determines that the best candidate for a replica cache is server 44 connected to router "h".

Next, step 414 of FIG. 4 creates a trial, new network traffic pattern. It does this by assigning the primary cache traffic previously directed from those routers near the candidate, replica cache server, to be redirected from going to the primary cache server, to going to the candidate server. Then step 414 calculates the total cost C[T] of the trial, new network traffic pattern.

Figure 6:
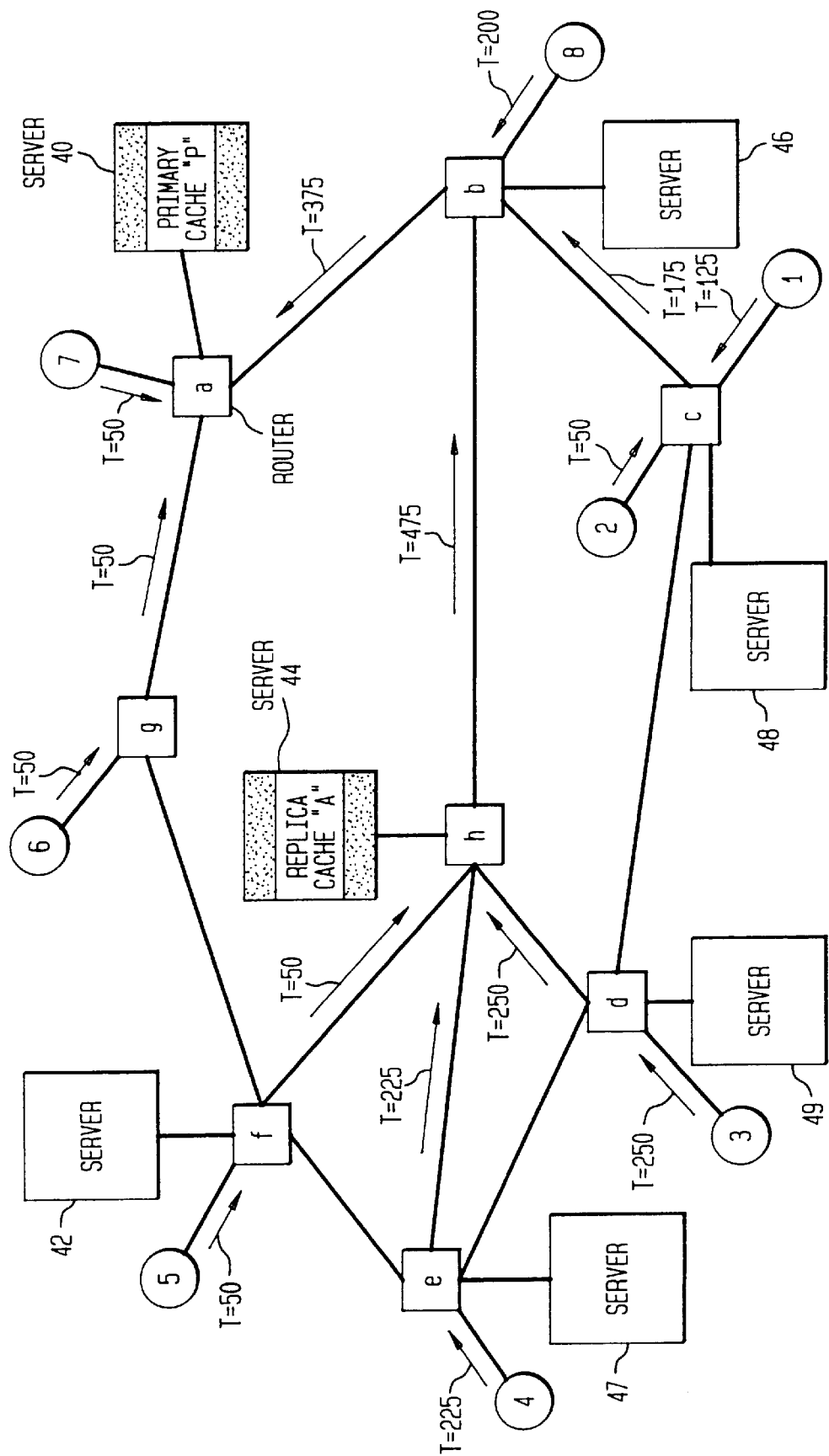
FIG. 6 shows a second stage organization of the example network of FIG. 5.

FIG. 6 shows the network of FIG. 5, with the trial, new network traffic pattern directed to the candidate, replica cache "A" on server 44 and to the primary cache "P" on server 40. Step 414 assigns the primary cache traffic previously directed from those routers d, e, and f that are near the candidate, replica cache server 44, to be redirected from going to the primary cache server 40, to going to the candidate server 44. Then step 414 calculates the total cost C[T] of the trial, new network traffic pattern for the network of FIG. 6.

The eleven network links interconnecting the routers of the trial, new network traffic pattern for the network of FIG. 6, have the following traffic. Network link "a-b" connecting routers "a" and "b" has a message traffic number of requests per unit time to server 40 of T=375. Network link "b-c" connecting routers "b" and "c" has a message traffic number of requests per unit time to server 40 of T=175. Network link "c-d" connecting routers "c" and "d" has a message traffic number of requests per unit time of T=0. Network link "d-e" connecting routers "d" and "e" has a message traffic number of requests per unit time of T=0. Network link "e-f" connecting routers "e" and "f" has a message traffic number of requests per unit time of T=0. Network link "f-g" connecting routers "f" and "g" has a message traffic number of requests per unit time of T=0. Network link "g-a" connecting routers "g" and "a" has a message traffic number of requests per unit time to server 40 of T=50. Network link "d-h" connecting routers "d" and "h" has a message traffic number of requests per unit time to replica cache server 44 of T=250. Network link "e-h" connecting routers "e" and "h" has a message traffic number of requests per unit time to replica cache server 44 of T=225. Network link "f-h" connecting routers "f" and "h" has a message traffic number of requests per unit time to replica cache server 44 of T=50. Network link "h-b" connecting routers "h" and "b" has a message traffic number of requests per unit time of T=0.

The bandwidth cost C[BW] for the network of FIG. 6 is calculated in step 414 of FIG. 4, to be the product of a proportionality constant attributed to the number of requests per unit time, times the sum of the number of requests per unit times on each link. For this example the number of requests per unit time cost per megabit is assumed to be 0.1. The sum of the values of "T" for the eleven network links is 1125. Thus, the bandwidth cost C[BW] calculated in step 414 for the network of FIG. 6 is 1125.

Next, step 414 of FIG. 4 calculates C[STO], the storage cost at the base location. For this example, this value is 500. Next, step 414 of FIG. 4 calculates C[REP], the replication cost in the single replica cache server 44. In this example the replication cost per megabits (per day) is 50. For a ten megabit file, this amounts to a replication cost C[REP] of 500. Next, step 414 of FIG. 4 calculates C[OC] the opportunity cost. Since the addition of the replica cache "A" is anticipated to meet all user requests for access to the data base, the value of C[OC] for the opportunity cost is zero, for this example. Next, step 414 of FIG. 4 calculates C[UP] the update cost associated with updating the replicated copies to keep them from being stale. The update cost is 100, for this example. Thus, step 414 of FIG. 4 calculates C[T]=C[BW]+C[STO]+C[REP]+C[OC]+C[UP] to have a value of 1125+500+500+0+100=2225.

Next, step 416 of FIG. 4 decides whether the trial, new network traffic pattern provides a lower total cost C[T] than does the existing distribution of caches. For the network of FIG. 6, step 416 determines the trial, new network traffic pattern provides a lower total cost C[T] of 2225 than does the existing distribution of caches in FIG. 5, which has a total cost C[T] of 3125. Thus, step 416 decides that trial, new network traffic pattern of FIG. 6 should be implemented and become the basis for a new router assignment for the routers of the network.

Figures 8A, 8B:
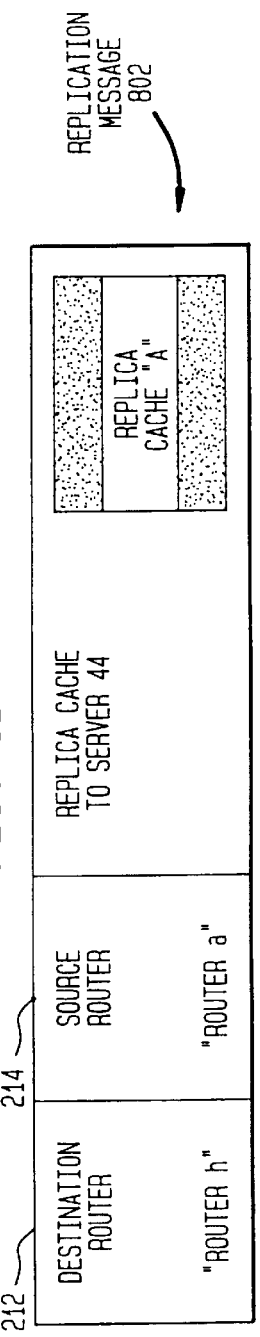
FIG. 8A shows an assignment message and FIG. 8B shows a replication message for the second stage organization of the example network of FIG. 6.

Next, step 418 of FIG. 4 broadcasts a new assignment to all routers. For the example of FIG. 6, router "a" broadcasts the new router table 336 is shown in FIG. 7B to the routers b, c, d, e, f, g, and h. This illustrates the principle of group casting by the invention, where a single router table 336 is distributed to many network routers, to selectively provide the identity of the destination cache, depending on the identity of the router performing the routing function. The assignment message 210, is shown in FIG. 8A. The assignment message 210 includes a field 212 specifying the destination router, a field 214 specifying the source router, and a field 216 specifying the new routing assignment computed by the cost/benefit analysis algorithm 415. A replication message 802 shown in FIG. 8B, is sent from the router "a" to the router "h", for example, to provide a copy of the data set as replica cache "A" to the new server 44. The field 212 specifies a destination router "h". The field 214 specifies the source router as router "a".

Step 418 of FIG. 4 then loops back to step 402. The loop back to step 402 can be delayed at step 420 until new traffic monitoring data has been received by the router 30. The original existing router table 334 in FIG. 7A is discarded. The new router table 336 in FIG. 7B becomes the new existing router table. Thus, the optimum replica cache assignment program 330 of FIG. 4 periodically reassesses the traffic distribution in the network, thereby adapting it to changing traffic patterns.

The assignment program 330 also provides for deleting replica caches from the network when they are no longer needed. Assume the traffic pattern changes from that shown in FIG. 6. User local access point 4 changes to a message traffic number of requests per unit time to replica cache "A" server 44 of T=25. User local access point 3 changes to a message traffic number of requests per unit time to replica cache "A" server 44 of T=50. Then step 412 calculates the tradeoff for deleting the replica cache "A" from server 44. Step 412 determines that the increase in the traffic on links h-b and b-a would be T=150, if the replica cache "a" were deleted. Step 412 also determines that the deletion of replica cache "A" would save the replication cost of 500. Step 412 recognizes that there is a net gain of 350 if the replica cache were removed. Step 416 then decides to tear down the replica cache "A". Step 418 then broadcasts the new assignment to all routers in the network.

In accordance with the invention, reverse tree generation is used to dynamically reorganize the caches in the network in response to usage patterns. This solves the problem of the dynamic nature of internet traffic, both over time and location. There are locations which are active at certain times of the day and at other times can be considered very inactive. The invention overcomes this by making its decision to replicate caches dynamically, based on usage patterns. The invention continuously updates "grow" decisions to add replica caches and "prune" decisions to delete them. This results a dynamic tree with servers at its dynamically changing core locations. Effectively, a minimum weight spanning tree is being built 'on the fly'. To avoid the accumulation of stale data at the replica cache servers, each of these servers will be continuously (if necessary) updated by using a protocol such as server cache synchronization protocol.

One aspect in the implementation of the invention is the way users access the replicated cache server closest to them. One embodiment is to let users first reach their destination point and find out the tree structure for that application, and then establish connection to the node in the spanning tree that is most appropriate. An alternate embodiment is to treat each application as a multicast group, and users requesting to join the group be routed accordingly by Groupcast capable routers. Groupcast (GC) is conceptually similar to the multicast however works in the opposite direction. A GC router keeps track of an updated routing table, and under normal conditions will act as a regular router. As a new minimum weight spanning tree starts to be developed, the entries in the routing table are updated.

The invention provides a way to change the distribution of replica caches, based on dynamic usage patterns. The invention accomplishes this by a reverse tree generation technique. The invention uses the opportunity cost of loosing unsuccessful customers, to dynamically optimize the distribution of replica caches.

An additional feature of the monitoring process performed by the network routers, is the collection of server hit information for the underlying data set application. This is useful for market research by the owner of the data set in the cache. There are other features of the invention, such as regional applications that accommodate the regional differentiation in the servers. For example, place regional editions of a newspaper, advertisement, promotions etc in the local servers.

Various illustrative examples of the invention have been described in detail. In addition, however, many modifications and changes can be made to these examples without departing from the nature and spirit of the invention.

What is claimed is:

1. In a network including a plurality of regions, each region including a router, a server, and a plurality of user terminals, the router coupling the server and the plurality of user terminals to the network, a method for distributing replica caches of information among the regions, comprising the steps of:

transmitting a monitor request message from a first router in a first region of the network to a plurality of routers in a second region of the network, requesting from the plurality of routers a measure of a plurality of service requests being directed to a first server in the first region storing a primary copy of information;

ascertaining with a processor associated with said first router, said measure of requests made by a plurality of user terminals in the network for said primary copy of information; and responsive to said measure of requests, said processor computing an optimum assignment to another server in another region of the network, to store a replica copy of said information and transmitting a message to a router in said another region to store said replica copy of said information as a replica cache, said router in said another region being selected by means of a cost/benefit analysis that calculates a total cost of a distribution of caches in the network;

wherein said optimum assignment is a distribution of replicas of said primary copy of information that minimizes a bandwidth cost of messages exchanged between said plurality of user terminals and an existing distribution of caches.

2. The method of claim 1, further comprising the step of:

responsive to said measure of requests, said processor in said first region transmitting a message to a router in at least one other region to redirect said requests made by user terminals to said replica cache.

3. The method of claim 1, further comprising the step of:

responsive to said measure of requests said processor in said first region selecting said router in at least one other region by means of a cost/benefit analysis.

4. The method of claim 1, further comprising the step of:

responsive to said measure of requests said processor in said first region selecting said router in at least one other region by means of a cost/benefit analysis that calculates a lost opportunity cost of not having a replica cache.

5. In a network including a plurality of regions, each region including a router, a server, and a plurality of user terminals, the router coupling the server and the plurality of user terminals to the network, a method for distributing cache replicas of information among the regions, comprising the steps of:

transmitting from a first router in a first region a monitor request message to a plurality of routers in other regions, requesting said other routers to monitor a plurality of requests from a plurality of user terminals directed to a first server in said first region, to deliver said information;

receiving monitor response messages from said other routers indicating a measure of requests made by a plurality of user terminals in the network for said information; and responsive to said response messages, transmitting a message to at least one of said other routers to store a copy of said information as an optimum distribution of said information that minimizes a bandwidth cost of messages exchanged between said plurality of user terminals and an existing distribution of the information, said one of said other routers being selected by means of a cost/benefits analysis that calculates a total cost of a distribution of caches in the network.

6. The method of claim 5, further comprising the step of:

responsive to said response messages, transmitting a message to a router in at least one other region to redirect said requests to said first server, to said replica cache.

7. The method of claim 5, further comprising the step of:

responsive to said response messages, selecting said first server by means of a cost/benefit analysis.

8. The method of claim 5, further comprising the step of:

responsive to said response messages, selecting said first server by means of a cost/benefit analysis that calculates a lost opportunity cost of not having a replica cache.

9. In a network including a plurality of regions, each region including a router, a server, and a plurality of user terminals, the router coupling the server and the plurality of user terminals to the network, a method for optimizing the distribution of replica caches of information among the regions, comprising the steps of:

receiving service request messages at a first router in a first region of the network, from a plurality of users in the network, the service requests being directed to a first server in the first region storing a primary copy of information;

transmitting a monitor request message from said first router to a second router in a second region of the network, requesting the second router to monitor service requests being directed to said first server from a plurality of user terminals;

receiving a monitor response message at said first router from said second router, providing a count of service requests being directed to said first server;

computing at said first router, an optimum assignment of a replica copy of said information for storage at another server in another region of the network; and transmitting an assignment message from said first router to said another server, to enable said another server to store said replica copy of said information and provide service to user terminals in an assigned subplurality of regions of the network, said another server being selected by means of a cost/benefit analysis that calculates a total cost of a distribution of caches in the network;

wherein said optimum assignment is a distribution of replicas of said primary copy of information that minimizes a bandwidth cost of messages exchanged between said plurality of user terminals and an existing distribution of caches.

10. The method of claim 9, further comprising the step of:

said computing step including selecting said another server by means of a cost/benefit analysis.

11. The method of claim 9, further comprising the step of:

said computing step including selecting said another server by means of a cost/benefit analysis that calculates a lost opportunity cost of not having a replica cache.

12. In a network including a plurality of regions, each region including a router, a server, and a plurality of user terminals, the router coupling the server and the plurality of user terminals to the network, a method for optimizing the distribution of replica caches of information among the regions, comprising the steps of:

forwarding service request messages from a plurality of users in the network, to a first server in the first region storing a primary copy of information;

receiving at a second router in a second region of the network, a monitor request message from said first router requesting the second router to monitor service requests being directed to said first server;

monitoring at said second router, service requests being directed to said first server;

transmitting a monitor response message from said second router to said first router, providing a count of service requests being directed to said first server;

receiving an assignment message at said second router from said first router, including an optimum assignment of a replica copy of said information for storage at a second server in said second region of the network; and enabling said second server to store said replica copy of said information and provide service to user terminals in an assigned subplurality of regions of the network.

13. In a network including a plurality of regions, each region including a router, a server, and a plurality of user terminals, the router coupling the server and the plurality of user terminals to the network, a system for distributing replica caches of information among the regions, comprising:

a router in a first region;

a processor coupled to said router, for ascertaining a measure of requests made by user terminals in the network for said information;

said router transmitting a message to a router in at least one other region to store a copy of said information as a replica cache, in response to said measure of requests.

14. The system of claim 13, further comprising:

responsive to said measure of requests, said router in said first region transmitting a message to a router in at least one other region to redirect said requests made by user terminals to said replica cache.

15. The system of claim 13 further comprising:

responsive to said measure of requests said processor selecting said router in at least one other region by means of a cost/benefit analysis.

16. The system of claim 13, further comprising:

responsive to said measure of requests said processor selecting said router in at least one other region by means of a cost/benefit analysis that calculates the total cost of a distribution of caches in the network.

17. The system of claim 13, further comprising:

responsive to said measure of requests said processor selecting said router in at least one other region by means of a cost/benefit analysis that calculates a lost opportunity cost of not having a replica cache.

18. In a network including a plurality of regions, each region including a router, a server, and a plurality of user terminals, the router coupling the server and the plurality of user terminals to the network, a method for optimizing the distribution of replica caches of information among the regions, comprising the steps of:

receiving service request messages at a first router in a first region of the network, from a plurality of users in the network, the service requests being directed to a first server in the first region storing a primary copy of information;

transmitting a monitor request message from said first router to a second router in a second region of the network, requesting the second router to monitor service requests from said plurality of user terminals being directed to said first server;

receiving a monitor response message at said first router from said second router, providing a count of service requests being directed to said first server;

computing at said first router, an optimum assignment of a replica copy of said information for storage at another server in another region of the network; and transmitting an assignment message from said first router to said another server, to enable said another server to store said replica copy of said information and provide service to user terminals in an assigned subplurality of regions of the network;

wherein said optimum assignment is a distribution of replicas of said primary copy of information that minimizes a total cost of an existing distribution of caches; and wherein the total cost is the sum of a bandwidth cost, a storage cost at a base location, a replication cost in a single server, an opportunity cost, and an update cost associated with updating replicated copies.

\* \* \* \* \*